United States Patent
Weingardt et al.

(10) Patent No.: US 12,303,838 B2
(45) Date of Patent: May 20, 2025

(54) PREFERRED FLOW PATHS FOR SPIRAL-WOUND ELEMENTS

(71) Applicant: Aqua Membranes, Inc., Albuquerque, NM (US)

(72) Inventors: Jay Collin Weingardt, Albuquerque, NM (US); Kevin Roderick, Albuquerque, NM (US); Jay Kendall Weingardt, Albuquerque, NM (US); Rodney E Herrington, Albuquerque, NM (US); Craig Beckman, Albuquerque, NM (US); Nelson Longmire, Albuquerque, NM (US)

(73) Assignee: Aqua Membranes, Inc., Albuquerque, NM (US)

( * ) Notice: Subject to any disclaimer, the term of this patent is extended or adjusted under 35 U.S.C. 154(b) by 651 days.

(21) Appl. No.: 17/632,230

(22) PCT Filed: Aug. 6, 2019

(86) PCT No.: PCT/US2019/045222
§ 371 (c)(1),
(2) Date: Feb. 1, 2022

(87) PCT Pub. No.: WO2021/025684
PCT Pub. Date: Feb. 11, 2021

(65) Prior Publication Data
US 2022/0288535 A1    Sep. 15, 2022

(51) Int. Cl.
*B01D 63/10* (2006.01)
*C02F 1/44* (2023.01)

(52) U.S. Cl.
CPC .......... *B01D 63/103* (2013.01); *B01D 63/10* (2013.01); *C02F 1/441* (2013.01); *B01D 2313/04* (2013.01); *B01D 2313/08* (2013.01); *B01D 2313/143* (2013.01); *B01D 2313/146* (2013.01);
(Continued)

(58) Field of Classification Search
CPC .. B01D 63/103; B01D 63/10; B01D 2313/04; B01D 2313/08; B01D 2313/143; B01D 2313/146; B01D 63/1031; B01D 65/003; B01D 2313/19; C02F 1/441; C02F 2201/004; C02F 2301/04; B32B 1/08; B32B 2307/726; B32B 2597/00; B32B 3/02; B32B 5/028; B32B 27/12; B32B 27/286
See application file for complete search history.

(56) References Cited

U.S. PATENT DOCUMENTS

| 3,963,621 A | 6/1976 | Newman |
| 4,187,173 A | 2/1980 | Keefer |
| 4,208,289 A | 6/1980 | Bray |

(Continued)

FOREIGN PATENT DOCUMENTS

| CA | 2662925 A1 | 1/2009 |
| CA | 2825674 C | 8/2011 |

(Continued)

*Primary Examiner* — Waqaas Ali
(74) *Attorney, Agent, or Firm* — V Gerald Grafe

(57) ABSTRACT

The present invention relates to a spiral wound membrane element designs that utilize entrance and exit points in the feed space channel and utilize barriers on the perimeter of the feed space as well as barriers in the feed space area to direct fluid flow in the membrane element.

12 Claims, 11 Drawing Sheets

(52) U.S. Cl.
CPC .... *C02F 2201/004* (2013.01); *C02F 2301/04* (2013.01)

(56) References Cited

U.S. PATENT DOCUMENTS

| | | | |
|---|---|---|---|
| 4,222,874 A | 9/1980 | Connelly | |
| 4,228,014 A | 10/1980 | Timm et al. | |
| 4,230,564 A | 10/1980 | Keefer | |
| 4,230,579 A | 10/1980 | Bray et al. | |
| 4,235,723 A | 11/1980 | Bartlett, Jr. | |
| 4,277,340 A | 7/1981 | Kanamaru et al. | |
| 4,288,326 A | 9/1981 | Keefer | |
| 4,309,287 A | 1/1982 | Roos et al. | |
| 4,326,960 A | 4/1982 | Iwahori et al. | |
| 4,341,631 A | 7/1982 | Hargitay | |
| 4,347,132 A | 8/1982 | Davis | |
| 4,354,939 A | 10/1982 | Pohl | |
| 4,358,377 A | 11/1982 | Clark | |
| 4,409,849 A | 10/1983 | Roos | |
| 4,410,429 A | 10/1983 | Harvey et al. | |
| 4,411,785 A | 10/1983 | Yu et al. | |
| 4,426,285 A | 1/1984 | Davis | |
| 4,434,056 A | 2/1984 | Keefer | |
| 4,454,891 A | 6/1984 | Dreibelbis et al. | |
| 4,461,707 A | 7/1984 | Thayer et al. | |
| 4,476,022 A | 10/1984 | Doll | |
| 4,482,459 A | 11/1984 | Shiver | |
| 4,534,713 A | 8/1985 | Wanner | |
| 4,556,488 A | 12/1985 | Timm et al. | |
| 4,585,554 A | 4/1986 | Burrows | |
| RE32,144 E | 5/1986 | Keefer | |
| 4,595,497 A | 6/1986 | Burrows | |
| 4,599,171 A | 7/1986 | Padilla et al. | |
| 4,600,512 A | 7/1986 | Aid | |
| 4,608,140 A | 8/1986 | Goldstein | |
| 4,613,436 A | 9/1986 | Wight et al. | |
| 4,623,451 A | 11/1986 | Oliver | |
| 4,623,467 A | 11/1986 | Hamlin | |
| 4,640,774 A | 2/1987 | Garcera et al. | |
| 4,645,601 A | 2/1987 | Regunathan et al. | |
| 4,652,373 A | 3/1987 | Trimmer | |
| 4,657,674 A | 4/1987 | Burrows | |
| 4,670,144 A | 6/1987 | McCausland et al. | |
| 4,695,375 A | 9/1987 | Tyler | |
| 4,704,324 A | 11/1987 | Davis et al. | |
| 4,705,625 A | 11/1987 | Hart, Jr. | |
| 4,735,716 A | 4/1988 | Petrucci et al. | |
| 4,735,718 A | 4/1988 | Peters | |
| 4,741,823 A | 5/1988 | Olsen et al. | |
| 4,743,366 A | 5/1988 | Burrows | |
| 4,744,895 A | 5/1988 | Gales et al. | |
| 4,744,900 A | 5/1988 | Bratt | |
| 4,756,835 A | 7/1988 | Wilson | |
| 4,775,465 A | 10/1988 | Burrows | |
| 4,781,831 A | 11/1988 | Goldsmith | |
| 4,784,771 A | 11/1988 | Wathen et al. | |
| 4,802,982 A | 2/1989 | Lien | |
| 4,814,079 A * | 3/1989 | Schneider | B01D 63/101 210/321.83 |
| 4,820,413 A | 4/1989 | Lopez | |
| 4,830,744 A | 5/1989 | Burrows | |
| 4,832,850 A | 5/1989 | Cais et al. | |
| 4,834,873 A | 5/1989 | Burrows | |
| 4,842,725 A | 6/1989 | Blad et al. | |
| 4,842,736 A | 6/1989 | Bray | |
| 4,844,805 A | 7/1989 | Solomon | |
| 4,855,058 A | 8/1989 | Holland et al. | |
| 4,856,559 A | 8/1989 | Lipshultz et al. | |
| 4,869,821 A | 9/1989 | Korin | |
| 4,874,514 A | 10/1989 | Casey, Jr. | |
| 4,876,002 A | 10/1989 | Marshall et al. | |
| 4,877,521 A | 10/1989 | Petrucci et al. | |
| 4,882,061 A | 11/1989 | Petrucci et al. | |
| 4,882,223 A | 11/1989 | Aptel et al. | |
| RE33,135 E | 12/1989 | Wanner, Sr. et al. | |
| 4,885,092 A | 12/1989 | Zwick | |
| 4,886,597 A | 12/1989 | Wild et al. | |
| 4,892,657 A | 1/1990 | Mohn et al. | |
| 4,902,417 A | 2/1990 | Lien | |
| 4,906,372 A | 3/1990 | Hopkins | |
| 4,917,847 A | 4/1990 | Solomon | |
| 4,937,557 A | 6/1990 | Tucci et al. | |
| 4,944,877 A | 7/1990 | Maples | |
| 4,988,525 A | 1/1991 | Gresch | |
| 4,990,248 A | 2/1991 | Brown et al. | |
| 4,992,170 A | 2/1991 | Menon et al. | |
| 4,995,977 A | 2/1991 | Hilgendorff et al. | |
| 5,002,664 A | 3/1991 | Clack et al. | |
| 5,017,284 A | 5/1991 | Miler et al. | |
| 5,034,126 A * | 7/1991 | Reddy | B01D 63/103 210/321.74 |
| 5,043,066 A | 8/1991 | Miller et al. | |
| 5,045,197 A | 9/1991 | Burrows | |
| 5,057,212 A | 10/1991 | Burrows | |
| 5,069,789 A | 12/1991 | Mohn et al. | |
| 5,078,876 A | 1/1992 | Whittier et al. | |
| 5,094,749 A | 3/1992 | Seita et al. | |
| 5,096,574 A | 3/1992 | Birdsong et al. | |
| 5,104,532 A | 4/1992 | Thompson et al. | |
| 5,108,604 A | 4/1992 | Robbins | |
| 5,128,035 A | 7/1992 | Clack et al. | |
| 5,131,277 A | 7/1992 | Birdsong et al. | |
| 5,132,017 A | 7/1992 | Birdsong et al. | |
| 5,145,575 A | 9/1992 | Burrows | |
| 5,167,786 A | 12/1992 | Eberle | |
| 5,167,826 A | 12/1992 | Eaton | |
| 5,183,567 A | 2/1993 | Mohn et al. | |
| 5,194,156 A | 3/1993 | Tomchak | |
| 5,198,110 A | 3/1993 | Hanai et al. | |
| 5,204,002 A | 4/1993 | Belfort et al. | |
| 5,232,591 A | 8/1993 | Solomon | |
| 5,234,583 A | 8/1993 | Cluff | |
| 5,240,612 A | 8/1993 | Grangeon et al. | |
| 5,279,732 A | 1/1994 | Edens | |
| 5,296,148 A | 3/1994 | Colangelo et al. | |
| 5,354,464 A | 10/1994 | Slovak et al. | |
| 5,362,383 A | 11/1994 | Zimmerman et al. | |
| 5,462,414 A | 10/1995 | Permar | |
| 5,466,366 A | 11/1995 | Chia-ching | |
| 5,468,387 A | 11/1995 | Solomon | |
| 5,507,943 A | 4/1996 | Labrador | |
| RE35,252 E | 5/1996 | Clack et al. | |
| 5,545,320 A | 8/1996 | Heine et al. | |
| 5,573,662 A | 11/1996 | Abe et al. | |
| 5,597,487 A | 1/1997 | Vogel et al. | |
| 5,626,752 A | 5/1997 | Mohn et al. | |
| 5,626,758 A | 5/1997 | Belfort | |
| 5,628,198 A | 5/1997 | Permar | |
| 5,681,459 A | 10/1997 | Bowman | |
| 5,681,467 A | 10/1997 | Solie et al. | |
| 5,788,858 A | 8/1998 | Acernese et al. | |
| 5,795,475 A | 8/1998 | Luedke et al. | |
| 5,811,251 A | 9/1998 | Hirose et al. | |
| 5,824,217 A | 10/1998 | Pearl et al. | |
| 5,914,041 A | 6/1999 | Chancellor | |
| 5,944,985 A | 8/1999 | Bowman | |
| 5,985,146 A | 11/1999 | Knappe et al. | |
| 6,030,535 A | 2/2000 | Hayashi et al. | |
| 6,071,404 A | 6/2000 | Tsui | |
| 6,071,414 A | 6/2000 | Kishi | |
| 6,099,735 A | 8/2000 | Kelada | |
| 6,109,029 A | 8/2000 | Vowles et al. | |
| 6,110,360 A | 8/2000 | Hart, Jr. | |
| 6,117,297 A | 9/2000 | Goldstein | |
| 6,120,682 A | 9/2000 | Cook | |
| 6,126,833 A | 10/2000 | Stobbe et al. | |
| 6,174,437 B1 | 1/2001 | Haney | |
| 6,190,557 B1 | 2/2001 | Hisada et al. | |
| 6,193,879 B1 | 2/2001 | Bowman | |
| 6,197,191 B1 | 3/2001 | Wobben | |
| 6,217,773 B1 | 4/2001 | Graham | |
| 6,258,270 B1 | 7/2001 | Hilgendorff et al. | |
| 6,277,282 B1 | 8/2001 | Kihara et al. | |
| 6,299,766 B1 | 10/2001 | Permar | |

(56) References Cited

U.S. PATENT DOCUMENTS

| | | |
|---|---|---|
| 6,345,961 B1 | 2/2002 | Oklejas, Jr. |
| 6,348,148 B1 | 2/2002 | Bosley |
| 6,379,518 B1 | 4/2002 | Osawa et al. |
| 6,379,548 B1 | 4/2002 | Kurokawa et al. |
| 6,383,384 B1 | 5/2002 | Anderson |
| RE37,759 E | 6/2002 | Belfort |
| 6,402,956 B1 | 6/2002 | Andou et al. |
| 6,423,212 B1 | 7/2002 | Bosko |
| 6,423,223 B1 | 7/2002 | Northcut et al. |
| 6,432,301 B1 | 8/2002 | Dengler |
| 6,436,282 B1 | 8/2002 | Gundrum et al. |
| 6,447,259 B2 | 9/2002 | Elliott-Moore |
| 6,514,398 B2 | 2/2003 | DiMascio et al. |
| 6,521,124 B2 | 2/2003 | Northcut et al. |
| 6,521,127 B1 | 2/2003 | Chancellor |
| 6,524,478 B1 | 2/2003 | Heine et al. |
| 6,540,915 B2 | 4/2003 | Patil |
| 6,575,308 B1 | 6/2003 | Fuls et al. |
| 6,579,451 B1 | 6/2003 | Avero |
| 6,607,668 B2 | 8/2003 | Rela |
| 6,613,231 B1 | 9/2003 | Jitariouk |
| 6,632,357 B1 | 10/2003 | Barger et al. |
| 6,790,345 B2 | 9/2004 | Broussard |
| 6,805,796 B2 | 10/2004 | Hirose et al. |
| 6,830,683 B2 | 12/2004 | Gundrum et al. |
| 6,866,831 B2 | 3/2005 | Nakao et al. |
| 6,929,743 B2 | 8/2005 | Diel |
| 6,929,748 B2 | 8/2005 | Avijit et al. |
| 7,021,667 B2 | 4/2006 | Campbell et al. |
| 7,186,331 B2 | 3/2007 | Maartens et al. |
| 7,244,357 B2 | 7/2007 | Herrington et al. |
| 7,297,268 B2 | 11/2007 | Herrington et al. |
| 7,306,437 B2 | 12/2007 | Hauge |
| 7,311,831 B2 | 12/2007 | Bradford et al. |
| 7,351,335 B2 | 4/2008 | Broens et al. |
| 7,387,725 B2 | 6/2008 | Choi et al. |
| 7,410,581 B2 | 8/2008 | Arnold et al. |
| 7,416,666 B2 | 8/2008 | Gordon |
| 7,449,093 B2 | 11/2008 | Dudziak et al. |
| 7,455,778 B2 | 11/2008 | Gordon |
| 7,501,064 B2 | 3/2009 | Schmidt et al. |
| 7,514,010 B2 | 4/2009 | Salmon |
| 7,520,981 B2 | 4/2009 | Barber |
| 7,540,956 B1 | 6/2009 | Kurth et al. |
| 7,650,805 B2 | 1/2010 | Nauseda et al. |
| 7,733,459 B2 | 6/2010 | Dierichs et al. |
| 7,736,503 B2 | 6/2010 | Kennedy et al. |
| 7,862,723 B2 | 1/2011 | Cartwright |
| 7,875,184 B2 | 1/2011 | Parker et al. |
| 7,892,429 B2 | 2/2011 | Oklejas, Jr. |
| 7,901,580 B2 | 3/2011 | Salyer |
| 7,909,998 B2 | 3/2011 | Kennedy et al. |
| 7,910,004 B2 | 3/2011 | Cohen et al. |
| 7,927,082 B2 | 4/2011 | Haudenschild |
| 7,981,293 B2 | 7/2011 | Powell |
| 8,021,550 B2 | 9/2011 | Beauchamp et al. |
| 8,101,074 B2 | 1/2012 | Larsen |
| 8,114,286 B2 | 2/2012 | Kawakami |
| 8,147,699 B2 | 4/2012 | Goldsmith |
| 8,236,177 B1 * | 8/2012 | Wood ................. B01D 63/1031 210/493.4 |
| 8,257,594 B2 | 9/2012 | Astle et al. |
| 8,282,823 B2 | 10/2012 | Acernese et al. |
| 8,292,088 B2 | 10/2012 | Francisco et al. |
| 8,292,492 B2 | 10/2012 | Ho et al. |
| 8,414,767 B2 | 4/2013 | Gaignet et al. |
| 8,425,734 B2 | 4/2013 | Goel et al. |
| 8,454,829 B2 | 6/2013 | Yaeger |
| 8,506,685 B2 | 8/2013 | Taylor et al. |
| 8,518,225 B2 | 8/2013 | Sumita et al. |
| 8,628,642 B2 | 1/2014 | Goel et al. |
| 8,652,326 B2 | 2/2014 | Johann et al. |
| 8,685,252 B2 | 4/2014 | Vuong et al. |
| 8,696,904 B2 | 4/2014 | Thiyagarajan et al. |
| 8,771,510 B2 | 7/2014 | Takahashi et al. |
| 8,778,055 B2 | 7/2014 | Taylor et al. |
| 8,808,538 B2 | 8/2014 | Oklejas, Jr. |
| 8,889,009 B2 | 11/2014 | Brausch et al. |
| 8,944,257 B2 | 2/2015 | Eisen et al. |
| 8,961,790 B2 | 2/2015 | Beauchamp et al. |
| 8,968,566 B2 | 3/2015 | Beauchamp et al. |
| 8,999,162 B2 | 4/2015 | Vuong et al. |
| 9,011,664 B2 | 4/2015 | Takahashi et al. |
| 9,011,688 B2 | 4/2015 | Takahashi et al. |
| 9,108,162 B2 | 8/2015 | Takahashi et al. |
| 9,114,365 B2 | 8/2015 | Schmitt |
| 9,260,325 B2 | 2/2016 | Takahashi et al. |
| 9,328,743 B2 | 5/2016 | Hirosawa et al. |
| 9,387,445 B2 | 7/2016 | Kimura et al. |
| 9,403,125 B2 | 8/2016 | Shaffer |
| 9,475,008 B2 | 10/2016 | Salama et al. |
| 9,492,792 B2 | 11/2016 | Tomescu et al. |
| 9,546,671 B2 | 1/2017 | Hirosawa et al. |
| 9,597,640 B2 | 3/2017 | Koiwa et al. |
| 9,616,390 B2 | 4/2017 | Hirozawa et al. |
| 9,617,172 B1 | 4/2017 | Baski |
| 9,724,646 B2 | 8/2017 | Okamoto et al. |
| 9,731,984 B2 | 8/2017 | Beall |
| 9,758,389 B2 | 9/2017 | Rau, III |
| 9,764,291 B2 | 9/2017 | Hirozawa et al. |
| 2008/0290031 A1 | 11/2008 | Popa |
| 2012/0018366 A1 | 1/2012 | Buser |
| 2012/0298578 A1 | 11/2012 | Herrington |
| 2013/0334128 A1 | 12/2013 | Takagi et al. |
| 2015/0068971 A1 | 3/2015 | Koiwa |
| 2016/0008763 A1 | 1/2016 | Roderick et al. |
| 2016/0236132 A1 | 8/2016 | Hara et al. |

FOREIGN PATENT DOCUMENTS

| | | | |
|---|---|---|---|
| WO | WO2010047360 A1 | 4/2010 | |
| WO | WO2015016253 A1 | 2/2015 | |
| WO | WO2017087461 A1 | 5/2017 | |
| WO | WO-2018190937 A1 * | 10/2018 | ............ B01D 63/10 |

* cited by examiner

PREFERRED FLOW PATHS FOR SPIRAL-WOUND ELEMENTS

TECHNICAL FIELD

The subject invention relates to a membrane system utilized for the separation of fluid components, specifically spiral-wound membrane elements.

BACKGROUND ART

Spiral-wound membrane filtration elements are well known in the art, and typically consist of a laminated structure, referred to as a leaf, comprised of a membrane sheet sealed to or around a porous permeate carrier on three sides. The porous permeate carrier extends beyond the membrane envelope at one end and wraps around the center tube which creates a path for removal of permeate fluid perpendicular to the axis of the center tube, through holes in the center tube, and out the end of the center tube. The laminated structure is wrapped spirally around the central tube and spaced from itself with a porous feed spacer to allow axial flow of the feed fluid through the element from the feed to the reject end of the spiral wound element. Traditionally, a feed spacer is used to allow flow of the feed water, some portion of which will pass through the membrane, into the spiral wound element and allow reject water to exit the element in a direction parallel to the center tube and axial to the element construction. Some spiral-wound membrane filtration elements employ a single leaf, while others comprise multiple leave all wound spirally around the center tube. In some configurations the leaves are relatively square, meaning that the leaf width is relatively close to the leaf length when folded over. This is typically the case for common 40" long elements of standard diameters such as 2.5", 4", 8", and 16". In other configurations, particularly for smaller spiral wound membrane elements which are shorter in length than 40" such as those used in residential or light commercial applications, the membrane leaves are longer in the dimension perpendicular to the center tube than in the dimension parallel to the center tube, the typical axis along which cross flow occurs. In some cases, the length of the leaves in such configurations are as much as three times or more than the leaf width. It is rare that elements are made in configurations where the leaf length is significantly less than the leaf width.

Improvements to the design of spiral wound elements have been disclosed in U.S. Pat. No. 6,632,357 to Barger et al., U.S. Pat. No. 7,311,831 to Bradford et al., and patents in Australia (2014223490) and Japan (6499089) entitled "Improved Spiral Wound Element Construction" to Roderick et al. which replace the conventional feed spacer with islands or protrusions either deposited or embossed directly onto the inside or outside surface of the membrane. Typically, fluid feed flow is normal to the center tube of the spiral wound element. In fabrication, after winding the element in the spiral configuration, the membrane sheet envelope is cut off after gluing and the feed edge of the membrane envelope presents a flat surface to the flow of feed solution. Provisional patent application No. 62/849,952 entitled "Entrance Features in Spiral Wound Elements" to Beckman, et al., describe tapered leading edges of the membrane sheet envelope. PCT patent application PCT/US2018/016318 entitled "Graded Spacers for Filtration Wound Elements" to Roderick, et al., describe feed spacer features that have variable heights down the length of the feed space and permeate carrier spaces. US patent application PCT/US17/62425 entitled "Flow Directing Devices for Spiral Sound Elements" to Herrington, et al., describe anti-telescoping devices that incorporate turning vanes to cause fluid flow to sweep the feed end of the spiral wound element to help avoid blockage of particles in the feed stream from impinging on the end of the membrane envelope.

None of these patents describe features that can be applied to the membrane sheet envelope that allows feed flow into the feed channel space on one end of the envelope, down the long length of the envelope, and out the opposite side of the feed envelope on the other end of the envelope. In element configurations where the leaf length is greater than the leaf width, such features can be advantageous. US Patent Application US2014/0021123 to Phillip Beauchamp, US Patent Application US2010/0096319 to Beauchamp, U.S. Pat. No. 9,795,924 to Janssen, et al, and U.S. Pat. No. 8,961,790 to Beauchamp, et al, describe unique flow paths down the length of the membrane sheet with a unique split center tube design. These designs have been commercialized by Pentair Corporation under license. UK Patent application UK 2499740 to Boris Liberman, describes a split tube center design with the advantage of flow down the length of the membrane sheet, and return up the length of the membrane sheet, facilitated by partitions down the center of the membrane sheet perpendicular to the center tube, in order to facilitate more uniform flux transfer in pressure retarded osmosis or forward osmosis spiral wound element designs.

DISCLOSURE OF INVENTION

Understanding of the present invention can be facilitated by the context of U.S. Pat. No. 6,632,357 to Barger et al., U.S. Pat. No. 7,311,831 to Bradford et al., and patents in Australia (2014223490) and Japan (6499089) entitled "Improved Spiral Wound Element Construction" to Roderick et al., each of which is incorporated herein by reference.

Many design parameters of spiral-wound elements affect element performance. Fluid flow characteristics such as flow velocity, flow channel shape, and feed spacer geometry affect residence time, shear, and turbulence which in turn affect performance characteristics such as membrane flux, rejection and recovery rate of a membrane system. Recovery of a spiral-wound filtration element is defined as the ratio of permeate flow to feed flow in the membrane element. Typical single element recovery for reverse osmosis elements currently in use ranges from 10% to 30%, meaning that 70-90% of feed water exits the element in the reject stream. For instance, in household reverse osmosis systems, it would be economically and environmentally more responsible to reduce the reject stream so that less water is wasted down the sanitary sewer versus water that is produced for drinking (i.e. permeate).

Conventional spiral wound membrane elements utilize feed flow paths that are parallel to the center tube in the spiral wound element, or utilize a split center tube and feed flow down the length of the membrane sheet towards the center tube in cases where the leaf length is significantly greater than the leaf width. Embodiments of the present invention provide selective openings in the feed and or reject ends of the feed flow channel that subsequently allows flow down the long length of the membrane sheet, or allows flow paths in the feed space of the membrane sheet that reduce pressure drop in the feed flow channel, increase residence time, improve shear and mixing, or reduce the feed space height thereby facilitating more membrane surface area in the spiral wound element. For pressure retarded osmosis or forward osmosis spiral wound element designs, an example embodiment of the present invention allows flow perpendicular to the center tube down the length of the membrane sheet without the requirement to utilize a split center tube. An example embodiment also allows multiple membrane sheets to be utilized in the same spiral wound element, something not generally achievable with split center tube designs. Additionally, an example embodiment allows the use of multiple spiral wound elements in a common pressure vessel without change to the membrane pressure vessel or interconnects between membrane elements and between the elements and the pressure vessel. This configuration can utilize conventional feed spacer mesh that has a uniform flat configuration, or can utilize stacked conventional mesh to create variable height flow channels. Variable height flow channels can be advantageous because they maintain flow velocity and minimize feed channel volume as the feed volume is reduced from inlet to outlet by fluid transport through the membrane. An example embodiment can be facilitated by utilizing spacers that are applied directly on the membrane sheet that allow variable height flow channels, or variable height entrance and exit points into the feed channel spaces.

An example embodiment provides a spiral wound element, comprising a collection tube and one or more permeable membrane sheets each having an active surface and a permeate surface, mounted together such that active surfaces face active surfaces and are separated from each other by a feed spacing system providing a feed space, and such that permeate surfaces face permeate surfaces and are separated from each other by a permeate spacer system providing a permeate space, with each sheet having a proximal end proximal the collection tube and a distal end distal from the collection tube, and having first and second edges extending from the proximal to the distal end, where the feed spacing system is configured to prevent fluid flow from the feed space at the distal end, and to prevent fluid flow into or out of the feed space along the edges except through one or more openings along the first edge, the second edge, or both. The openings can occupy a portion of the length of the edge; as examples ½ the length, ¼ the length, ⅒ the length; or as example 1", or 3" or 6" along the edge; or other portion or length required to provide the flow characteristics as described more fully below.

In an example embodiment, the feed spacing system comprises: (a) a distal end barrier sealingly engaging the active surfaces of two membrane sheets along the distal ends thereof; (b) a proximal end barrier sealingly engaging the active surfaces of the two membrane sheets along the proximal ends thereof; (c) a first edge barrier sealingly engaging the active surfaces of the two membrane sheets along the first edges thereof, wherein the first edge barrier extends from the proximal ends of the sheets to the distal ends of the sheets except for a first feed flow opening; and (d) a second edge barrier sealingly engaging the active surfaces of the two membrane sheets along the second edges thereof, wherein the second edge barrier extends from the proximal ends of the sheets to the distal ends of the sheets except for a second feed flow opening. Note that, in a membrane that is folded to provide an envelope then the fold line can provide one of the barriers. In currently common constructions the fold line can serve as the proximal end barrier. Note that a "sealing" engagement in the case of the edge barriers does not need to be completely fluid-proof, but needs to provide sufficient resistance to fluid flow that a majority of the fluid flow is directed through the opening(s) therethrough and not over or through the edge barriers. The feed flow openings can occupy a portion of the length of the edge; as examples ½ the length, ¼ the length, ⅒ the length; or as example 1", or 3" or 6" along the edge; or other portion or length required to provide the flow characteristics as described more fully below.

In an example embodiment, the first edge barrier extends from the proximal ends of the sheets to the distal ends of the sheets except for a first feed flow opening near the proximal ends; and wherein the second edge barrier extends from the proximal ends of the sheets to the distal ends of the sheets except for a second feed flow opening near the distal ends.

In an example embodiment, the first edge barrier extends from the proximal ends of the sheets to the distal ends of the sheets except for a first feed flow opening near the proximal ends or near the distal ends.

In an example embodiment, the feed spacing system comprises: (a) a distal end barrier sealingly engaging the active surfaces of two membrane sheets along the distal ends thereof; (b) a proximal end barrier sealingly engaging the active surfaces of the two membrane sheets along the proximal ends thereof; (c) a first edge barrier sealingly engaging the active surfaces of the two membrane sheets along the first edges thereof and extending from the proximal ends to the distal ends except for a feed flow opening spaced apart from the proximal ends spaced apart from the distal ends; and (d) a second edge barrier sealingly engaging the active surfaces of the two membrane sheets along the second edges thereof and extending from the proximal ends to the distal ends except for a second feed flow opening near the proximal ends and a second feed flow opening near the distal ends.

In an example embodiment, the feed spacing system further comprises one or more pairs of inner barriers sealingly engaging portions of the active surfaces of the membrane sheets, where each pair of inner barriers comprises a first inner barrier extending from the first edges of the membrane sheets toward but not reaching the second edges of the membrane sheets; and a second inner barrier extending from the second edges of the membrane sheets toward but not reaching the first edges of the membrane sheets; where each first barrier is spaced apart from the corresponding second inner barrier by a distance along the length of the membrane sheets. Note that a "sealing" engagement in the case of the barriers does not need to be completely fluid-proof, but needs to provide sufficient resistance to fluid flow that a majority of the fluid flow is directed along the membrane and not over or through the inner barrier.

In an example embodiment, the feed spacing system further comprises one or more pairs of inner barriers sealingly engaging portions of the active surfaces of the membrane sheets, where each pair of inner barriers comprises a first inner barrier extending from the proximal ends of the membrane sheets toward but not reaching the distal ends of the membrane sheets; and a second inner barrier extending from the distal ends of the membrane sheets toward but not reaching the proximal ends of the membrane sheets; where each first barrier is spaced apart from the corresponding second inner barrier by a distance along the width of the membrane sheets.

In an example embodiment, the feed spacing system comprises: (a) a distal end barrier sealingly engaging the active surfaces of two membrane sheets along the distal ends thereof; (b) a proximal end barrier sealingly engaging the active surfaces of the two membrane sheets along the proximal ends thereof; (c) a first edge barrier sealingly engaging the active surfaces of the two membrane sheets along the first edges thereof and extending from the proximal ends to the distal ends except for a feed flow opening spaced apart from the proximal ends spaced apart from either the proximal or the distal ends; (d) a second edge barrier sealingly engaging the active surfaces of the two membrane sheets along the second edges thereof and extending from the proximal ends to the distal ends except for a second feed flow opening near the same ends as the first feed flow opening; and (e) an inner barrier sealingly engaging portions of the active surfaces of the two membrane sheets, extending from the distal end barrier beginning at a first distance from the first edges toward but not reaching the proximal end barrier and ending a second distance from the first edges, wherein the first distance is not equal to the second distance. As examples, the first distance can be ¼ of the membrane width, ⅓ of the width, ½ of the width, or ¾ of the width. The second distance can be ¼ of the membrane width, ½ of the width, ⅔ of the width, or ¾ of the width. Proportions and combinations within those ranges can also be suitable. The exact proportions can be determined as further described below. The distance from the end of the barrier to the proximal end barrier can be ½ the membrane length, ¼ the length, 1/10 the length; or as example 1", or 3" or 6" along the edge; or other portion or length required to provide the flow characteristics as described more fully below.

In an example embodiment, the width of the feed flow path defined by the first and second edge barriers and the inner barrier decreases at a rate corresponding to the decrease in feed fluid volume due to transmission of fluid across the membranes to the permeate space as feed fluid moves along the feed flow path.

In an example embodiment, the feed spacing system comprises: (a) a distal end barrier sealingly engaging the active surfaces of two membrane sheets along the distal ends thereof; (b) a first edge barrier sealingly engaging the active surfaces of the two membrane sheets along the first edges thereof; and (c) a second edge barrier sealingly engaging the active surfaces of the two membrane sheets along the second edges thereof; (d) wherein the first and second edge barriers extend from the proximal ends of the sheets to the distal ends of the sheets except for a feed flow opening near the distal ends; and (e) wherein the permeate space is in fluid communication with a permeate portion of the collection tube; and (f) wherein the feed space near the proximal ends is in fluid communication with a feed reject portion of the collection tube.

In an example embodiment, the feed spacing system comprises: (a) a proximal end barrier sealingly engaging the active surfaces of two membrane sheets along the proximal ends thereof; (b) a first edge barrier sealingly engaging the active surfaces of the two membrane sheets along the first edges thereof; and (c) a second edge barrier sealingly engaging the active surfaces of the two membrane sheets along the second edges thereof; (d) wherein the first edge barrier, the second edge barrier, or both the first and second edge barriers extend from the proximal ends of the sheets to the distal ends of the sheets except for a feed reject opening near the proximal ends; and (e) wherein the feed space is open to accept feed fluid at the distal ends.

In an example embodiment, the feed space separates the two sheets by a first distance near the distal and proximal ends and by second distance apart from the distal and proximal ends, wherein the first distance is greater than the second distance.

In an example embodiment, the feed spacer system separates the two sheets by a first distance near the distal ends and by a second distance near the proximal ends, wherein the first distance is greater than the second distance.

In an example embodiment, the feed spacer system separates the two sheets by a distance that smoothly tapers from the first distance to the second distance along the length of the sheets.

In an example embodiment, the permeate spacer system separates the two sheets by a third distance near the distal ends and by a fourth distance near the proximal ends, wherein the difference between the fourth and third distances corresponds to the distance between the first and second distances. The correspondence provides for consistent total thickness at the proximal and distal ends; the tapers from proximal to distal can be complementary or can be distinct form each other.

An example embodiment provides a system for treating water, comprising one or more spiral wound elements as described herein.

An example embodiment provides a method for treating fluid, e.g., water, chemical solutions, industrial fluids, etc., comprising providing a system as described herein, supplying feed fluid to the system, and accepting treated water from the permeate space of the system.

An example embodiment provides a spiral wound element as described herein, wherein the permeate space system, the feed spacer system, or both, comprise one or more mesh spacers.

An example embodiment provides a spiral wound element as described herein, wherein the permeate space system, the feed spacer system, or both, comprise a material printed, embossed, or deposited on one or more surfaces of the membrane sheets.

MODES FOR CARRYING OUT THE INVENTION AND INDUSTRIAL APPLICABILITY

Figure 1:
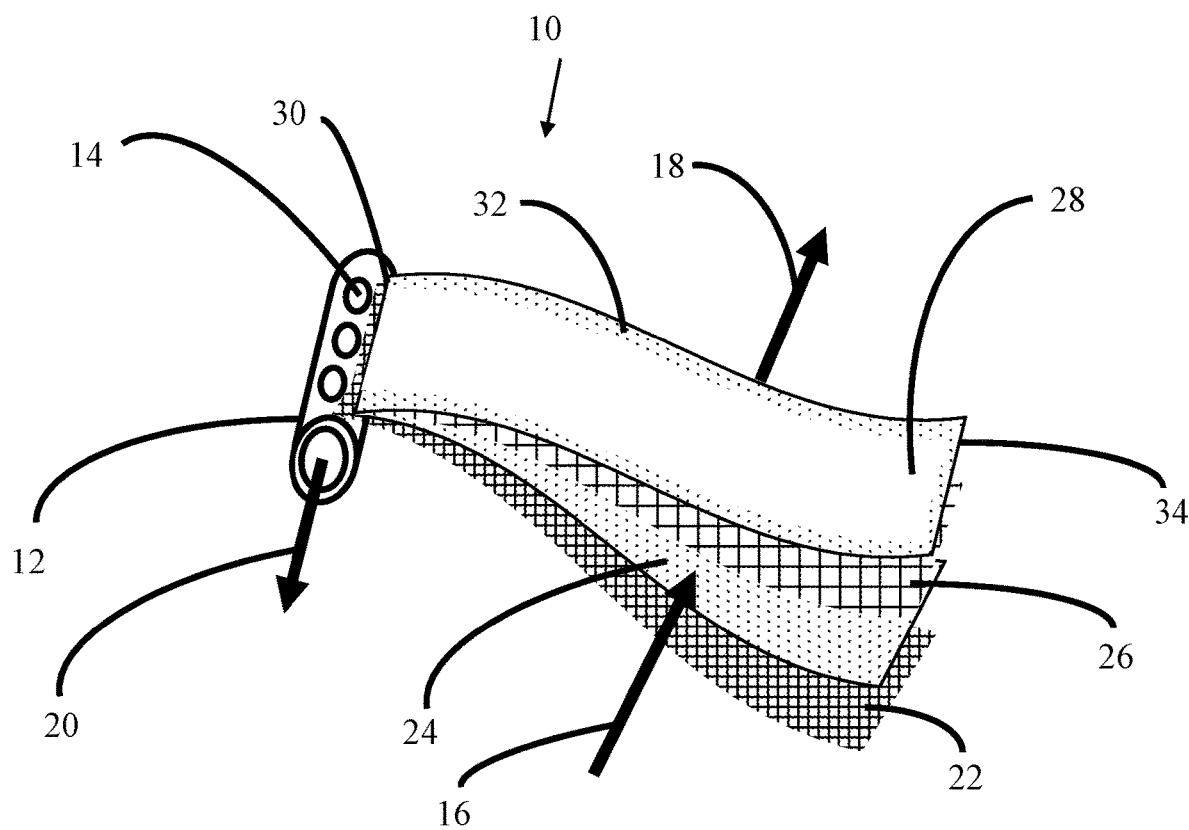
FIG. 1 is a view of a conventional spiral wound membrane element prior to rolling.

FIG. 1 illustrates some important elements of a conventional spiral wound membrane element 10. Permeate collection tube 12 comprises holes 14 in collection tube 12 where permeate fluid is collected from permeate feed spacer 22. In fabrication, membrane sheets 24 and 28 comprises one sheet that is folded at center line 30. Membrane sheets 24 and 28 are typically comprised of a porous support layer, for example polysulfone, and an active polymer membrane layer bonded or cast on to the support layer. Active polymer membrane surface 24 is adjacent to feed spacer mesh 26 and non-active support layer 28 is adjacent to permeate carrier 22.

Feed solution 16 enters between active polymer membrane surfaces 24 and flows through the open spaces in feed spacer mesh 26. As feed solution 16 flows through feed spacer mesh 26, total dissolved solids (TDS) ions are rejected at active polymer membrane surfaces 24 and molecules of permeate fluid, for instance water molecules, pass through active polymer membrane surfaces 24 and enter porous permeate carrier 22. As feed solution 16 passes along active polymer membrane surface 24, the concentration of TDS ions increases due to the loss of permeate fluid in bulk feed solution 16, and thereby exits the reject end of active polymer membrane sheet 24 as reject solution 18 with a higher TDS than feed solution 16. Permeate fluid in permeate carrier 22 flows from distal end 34 of permeate carrier 22 in the direction of center tube 12 where the permeate fluid enters center tube 12 through center tube entrance holes 14 and exits center tube 12 as permeate solution 20. To avoid contamination of the permeate fluid with feed solution 16, active polymer membrane surfaces 24 are sealed with adhesive along adhesive line 32 through permeate carrier 22 thereby creating a sealed membrane envelope where the only exit path for permeate solution 20 is through center tube 12.

Figure 2:
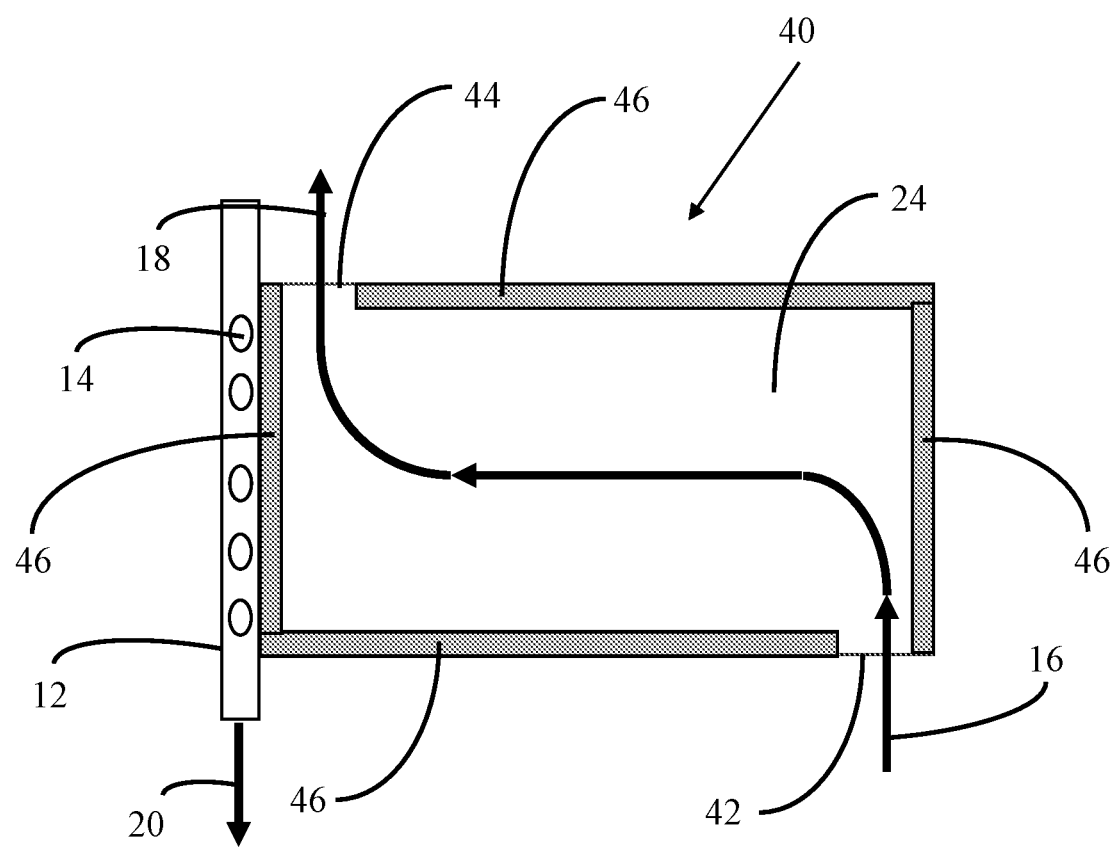
FIG. 2 is a view of the feed space of a spiral wound element with a feed entrance on one end and a reject stream exit on the other end of the membrane envelope.

In an example embodiment of the present invention shown in FIG. 2, axial feed flow is channeled through a discrete feed channel input opening in a first face (one of the ends of the element after rolling the membrane sheet around the central tube) of the spiral-wound element and feed flow is forced down the long dimension of the membrane sheet where the reject flow exits via a discrete feed reject exit opening. In the configuration of FIG. 2, feed space envelope 40 has a feed channel input opening 42 that is somewhat narrow relative to the full length of membrane sheet 24 whereby feed solution 16 enters the feed space and the feed solution flows largely perpendicular to center tube 12 (traversing both the width and length of the membrane as it flows from input to exit, and the length in this example being larger than the width) rather than parallel to center tube 12 as in elements where the entire face of the element is open for feed inflow and outflow. Feed solution ultimately exits as reject solution 18 through feed space envelope reject exit opening 44. Feed space envelope 40 has barrier lines 46 around the perimeter of feed space envelope 40, except for the feed channel input opening 42 and feed reject exit opening 44. Barrier lines 46 can comprise glue lines, printed spacer material, tape, or other suitable material that generally confines the feed space solution to flow in the designated flow path. It should be noted that barrier lines 46 do not need to provide a leak proof seal between adjacent membrane sheets. While a leak proof seal can be desirable, it is sufficient that barrier lines 46 provide sufficient seal to ensure that the feed solution generally travels along the intended flow path.

The spacing height of feed space 40 can be constant, or can be variable in height along the length in order to maintain constant fluid shear as feed solution 16 decreases in bulk volume as it converts to reject solution 18. Variable height feed spacers or stacked conventional mesh spacers can be utilized in any of the configurations discuss herein to vary the height of the feed space. At a fixed flow rate, this flow path will have significantly higher feed flow velocity than a conventional axial flow element. In configurations employing mesh feed spacer this can result in higher pressure drop in the feed channel, but in many applications, for example residential under sink reverse osmosis, pressure drop is not an important consideration. In configurations employing alternative feed spacer design such as spacing features printed onto the membrane surface, significant reduction in this pressure drop can be achieved allowing higher velocity flow without significant pressure increase.

Figure 3:
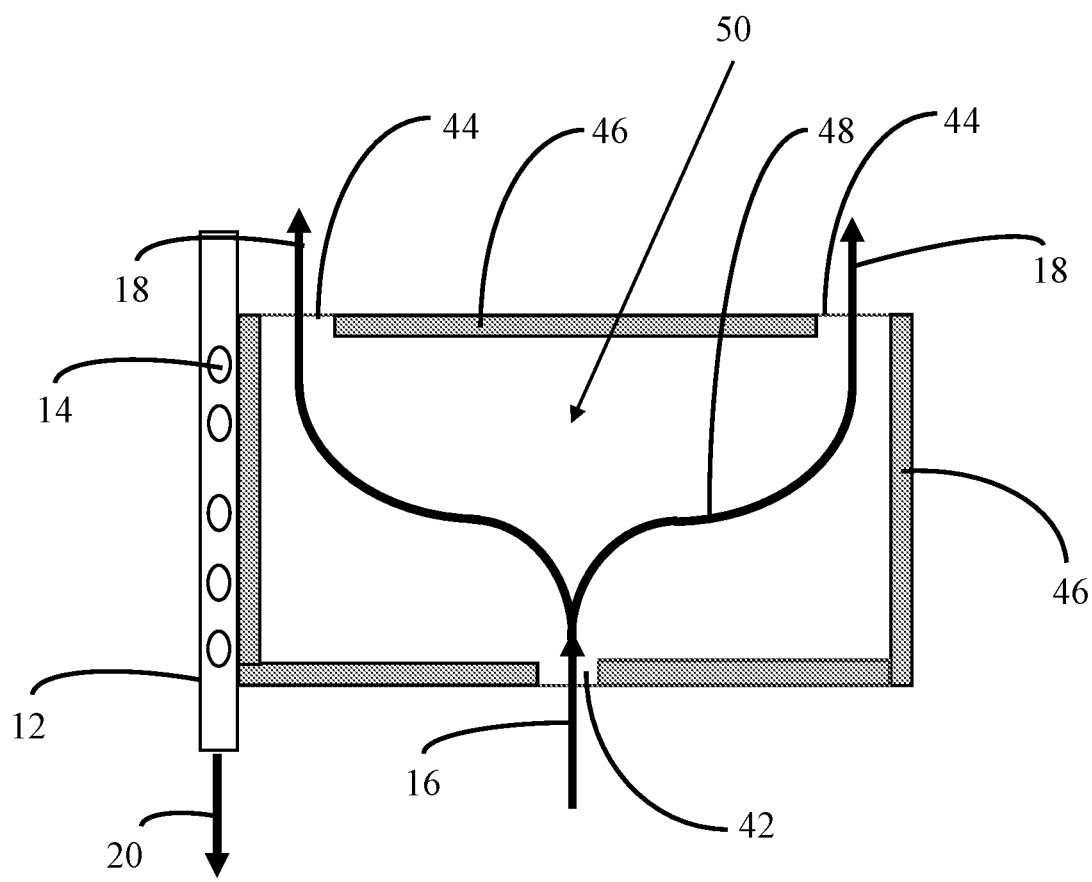
FIG. 3 is a view of the feed space of a spiral wound element with a feed entrance in the middle of the feed space envelope with reject stream exits on both ends of the membrane envelope.

In an example embodiment of the present invention shown in FIG. 3, feed solution 16 enters generally at the center (determined along the unrolled length) of feed space envelope 50. Feed solution 16 is then split in two separate feed solution streams 48 subsequently discharged from feed space envelope 50 through first and second end openings 44 as reject solution 18. Feed space envelope 50 is constrained by barrier lines 46 around the perimeter of feed space envelope 50.

Figure 4:
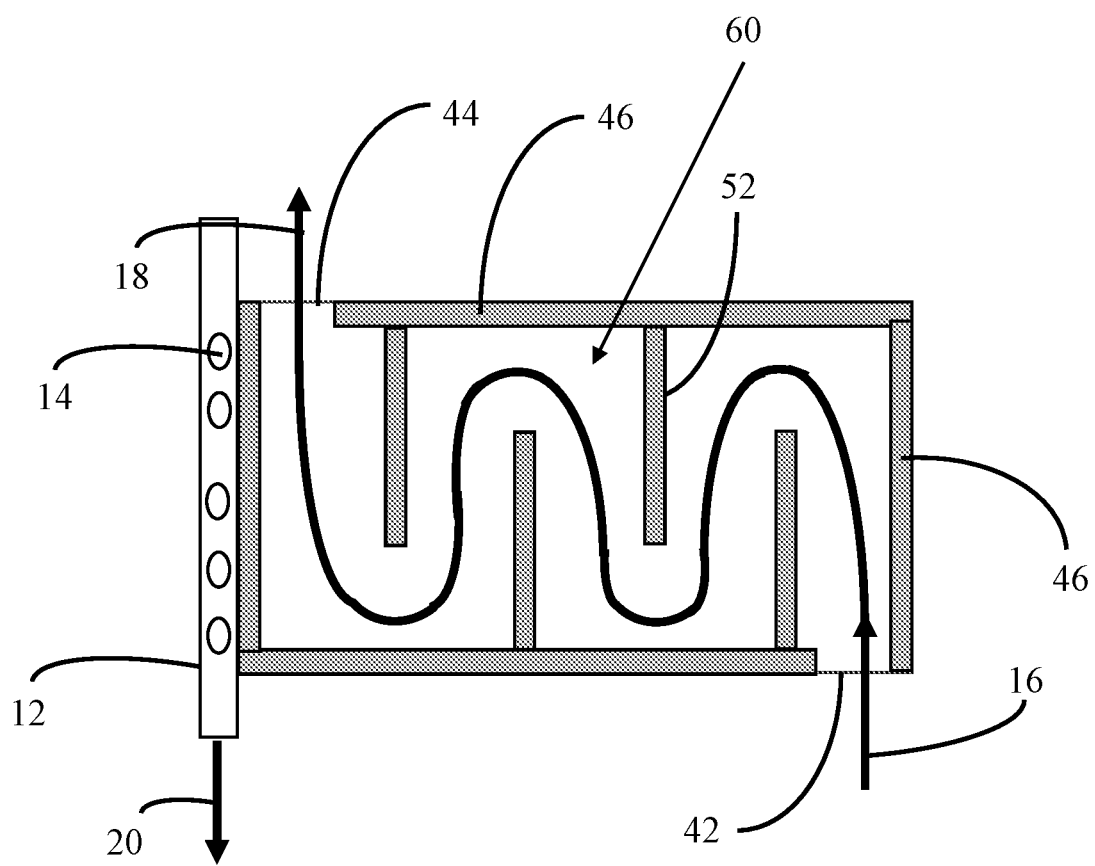
FIG. 4 is a view of the feed space of a spiral wound element with barriers in the feed space that creates a long feed flow path that is generally in the direction of flow parallel to the center tube.

In an example embodiment of the present invention shown in FIG. 4, internal barrier lines 52 force feed solution 16 to enter at feed space 60 feed entrance area 42 and flow in a zig-zag path that is overall parallel to center tube 12 (traversing the length of the membrane while zig-zagging across the width). The feed solution finally exits as reject solution 18 through feed space exit 44. The perimeter of feed space 60 is defined by barrier lines 46.

Figure 5:
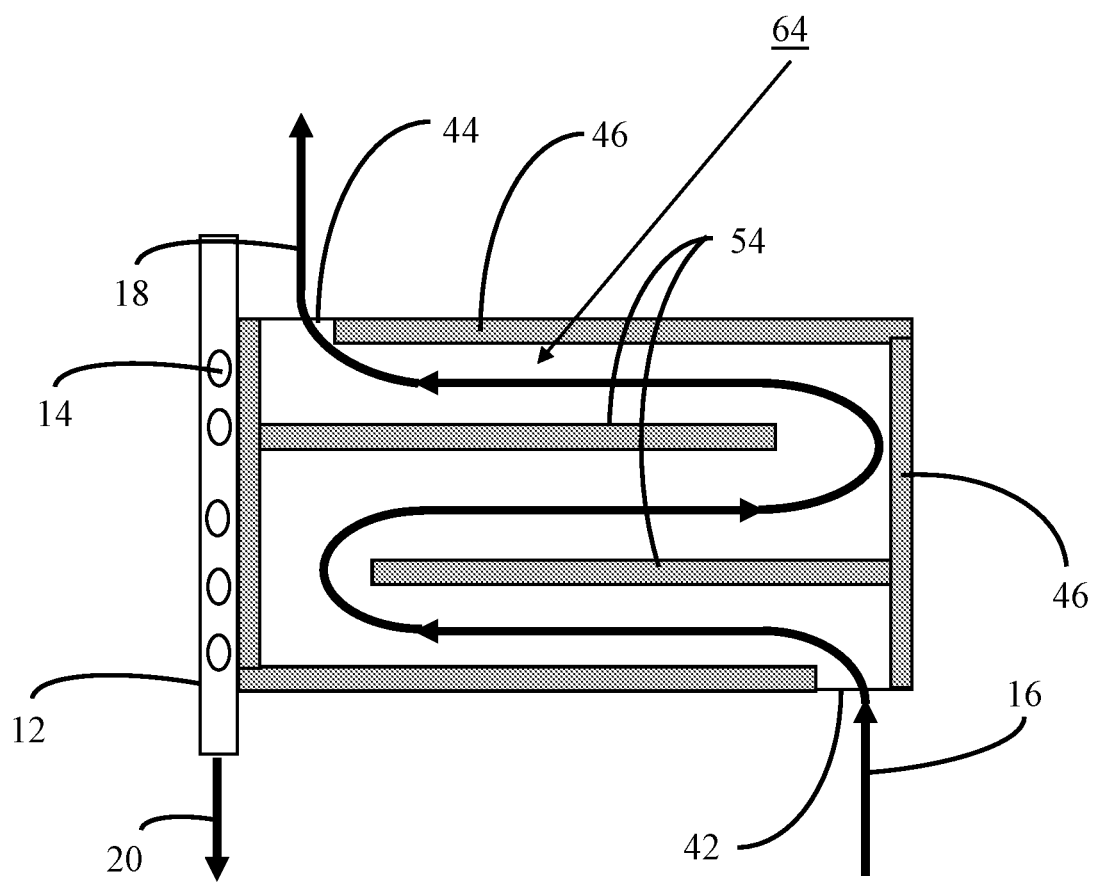
FIG. 5 is a view of the feed space of a spiral wound element with barriers in the feed space that creates a long feed flow path that is generally in the direction of flow perpendicular to the center tube.

In an example embodiment of the present invention shown in FIG. 5, internal barrier lines 54 force feed solution 16 to enter at feed space 64 feed entrance area 42 and flow in a zig-zag path that is overall perpendicular to center tube 12 (traversing the width of the membrane while zig-zagging across the length). The feed solution finally exits as reject solution 18 through feed space exit 44. The perimeter of feed space 64 is defined by barrier lines 46. Increasing the length of the flow path allows for higher flow velocity at a fixed flow rate compared to conventional axial flow, or increased fluid residence time in contact with the membrane with a reduced flow rate, or combination thereof depending on the flow rate and length of the flow path.

Figure 6:
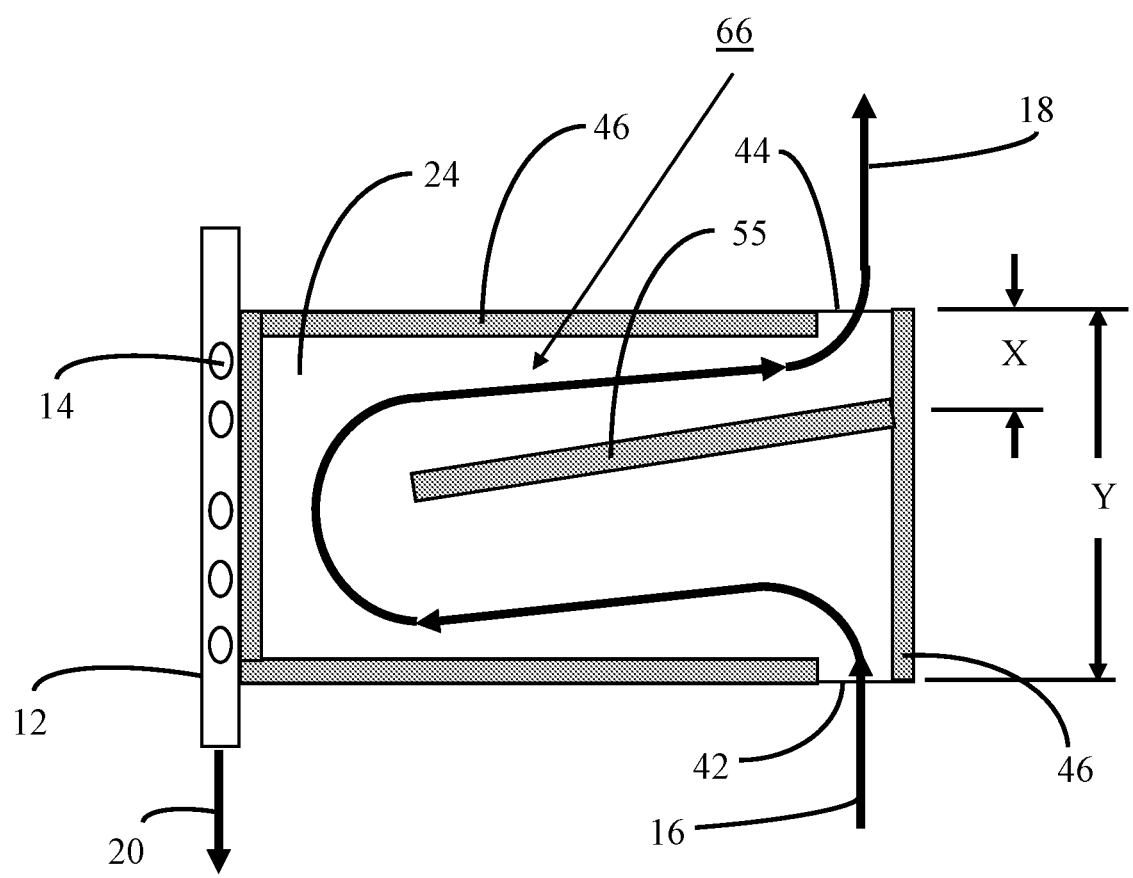
FIG. 6 is a view of a feed space with a uniform spacer height but with separation lines that create variable flow rates due to the width of the spacer channel.

In an example embodiment of the present invention shown in FIG. 6, internal barrier lines 55 force feed solution 16 to enter at feed space 66 feed entrance area 42 and flow in a path that gradually decreases in width from input to exit 44, corresponding to feed solution 16 being generally reduced in volume by fluid molecules passing through membrane sheet 24 thereby decreasing the volume of the feed solution while increasing the TDS concentration of the feed solution. The feed solution finally leaves feed space 66 as reject solution 18 via feed space exit 44. The perimeter of feed space 66 is defined by barrier lines 46. As previously discussed, recovery is defined as the ratio of permeate solution 20 to feed solution 16. Reject solution 18 is at a higher TDS concentration and smaller volume flow rate than feed solution 16. Therefore, the membrane element in the configuration shown in FIG. 6 can be configured to maintain a relatively constant flow velocity with respect to the element rejection by adjusting the ratio of X to Y, whereby X is defined as the point that barrier 55 comes in contact with perimeter barrier 46 at the distal end of feed space 66 opposite of center tube 12. This configuration can be reversed such that feed channel opening 42 and feed space exit 44 can be adjacent to center tube 12. Further, a flow path with decreasing width can be implemented in the other example embodiments, as examples by configuring the spacing and relative angles of the internal barriers in the example embodiments in FIG. 4 and FIG. 5.

Figure 7:
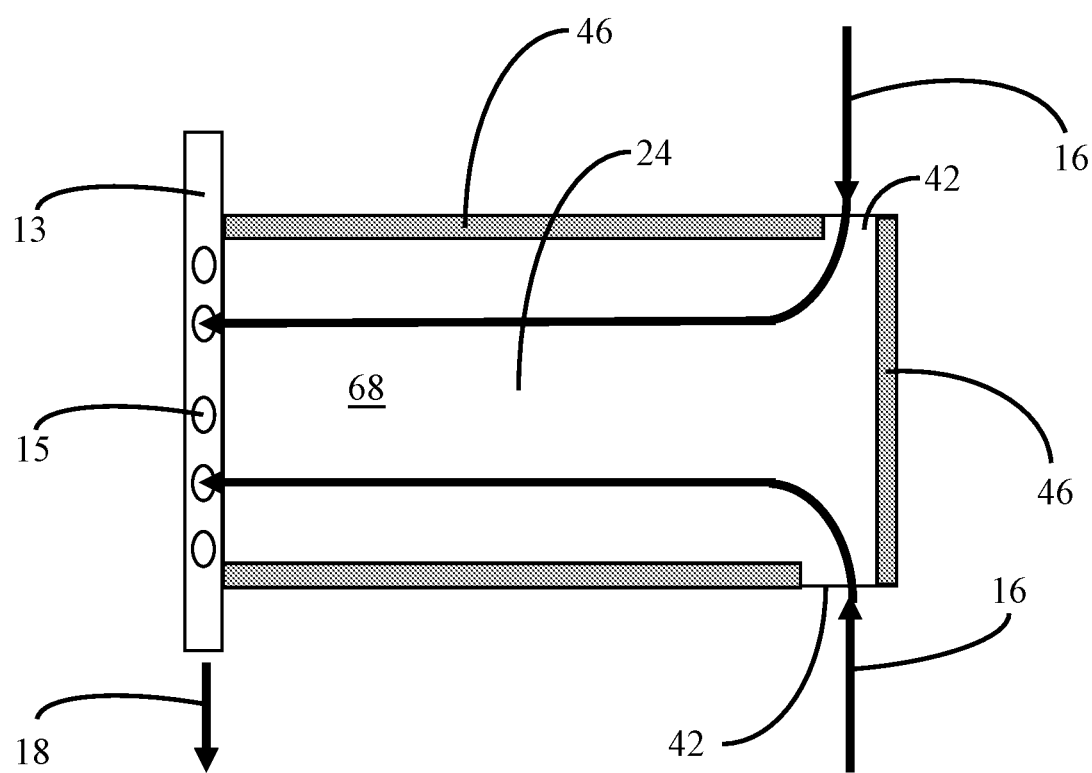
FIG. 7 is a view of the feed space of a spiral wound element with feed space entrances on one end of the feed space, and a reject flow path that discharges out of a center tube.

In an example embodiment of the present invention shown in FIG. 7, feed solution 16 enters feed space 68 feed entrance areas 42 and flows in a path perpendicular to split center tube 13 thereby entering though center tube holes 15 and exiting as reject solution 18. Permeate solution can then enter the alternate half of split center tube 13. Entrance area 42 can only be provided on both sides of the membrane as shown, or can be provided on only one side of feed space 68 if desired for the flow connections of the element when in a treatment system.

Figure 8:
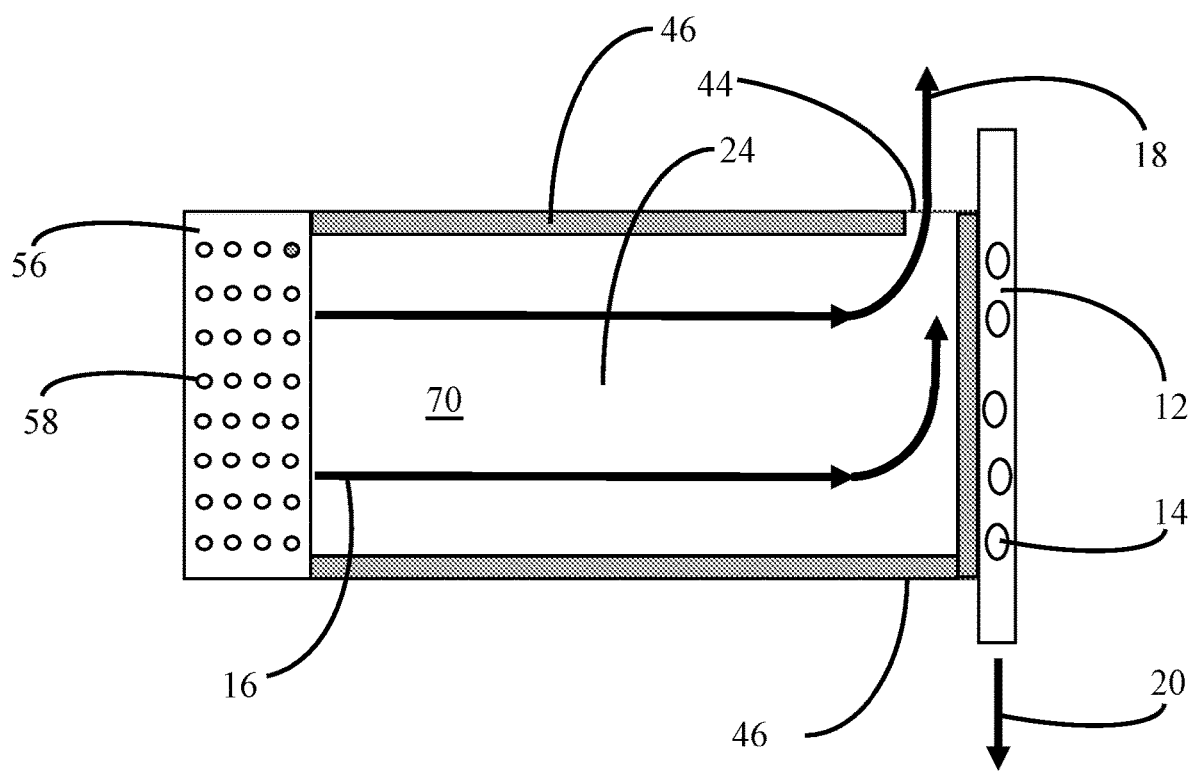
FIG. 8 is a view of the feed space of a spiral wound element with a feed entrance at one end of the feed space and a reject stream exiting at one side of the feed space envelope at the opposite end of the feed space envelope from the feed end.

In an example embodiment of the present invention shown in FIG. 8, feed solution 16 enters feed space 70 feed entrance holes 58 that are provided in outer wrap 56 and flows in a path perpendicular to center tube 12 thereby exiting feed space 70 as reject solution 18 via reject exit opening 44 (shown at just one end of the tube, although it can be provided at the other end, or both ends, if desired for specific system flow considerations). A brine seal is employed around the outside of the spiral-wound element at the reject end in order to force flow through the feed entrance holes 58 and prevent the feed solution 16 from mixing with the reject solution 18. This configuration avoids the split center tube design typically required in previous element designs which channel flow down the length of the membrane sheet.

Figure 9:
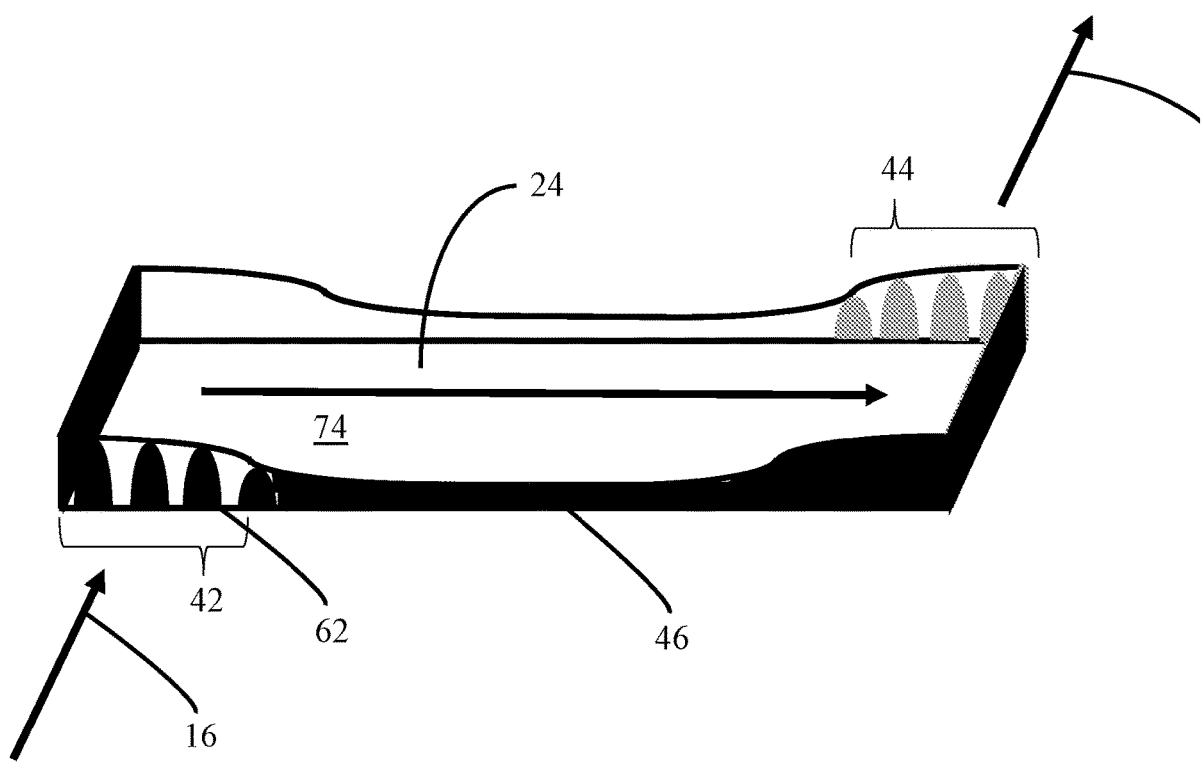
FIG. 9 is an isometric view of a feed space envelope with taller entrance and exit spaces than the space in the middle section of the feed space envelope.

In an example embodiment of the present invention shown in FIG. 9, feed space 74 can be provided by variable height feed spacers 62 such that the spacing at the feed channel opening 42 and the reject exit opening 44 is greater (i.e., the spacers are taller in those regions) than in the area between the openings to facilitate higher volume flow of feed solution 16 and reject solution 18 at the entrance and exit points of feed space 74. Barrier lines 46 confine the fluid to feed space 74 at all points around the perimeter of feed space 74 except the feed and reject openings. Variable height feed space can also be used in combination with the controlled feed flow paths provided by other example embodiments.

Figure 10:
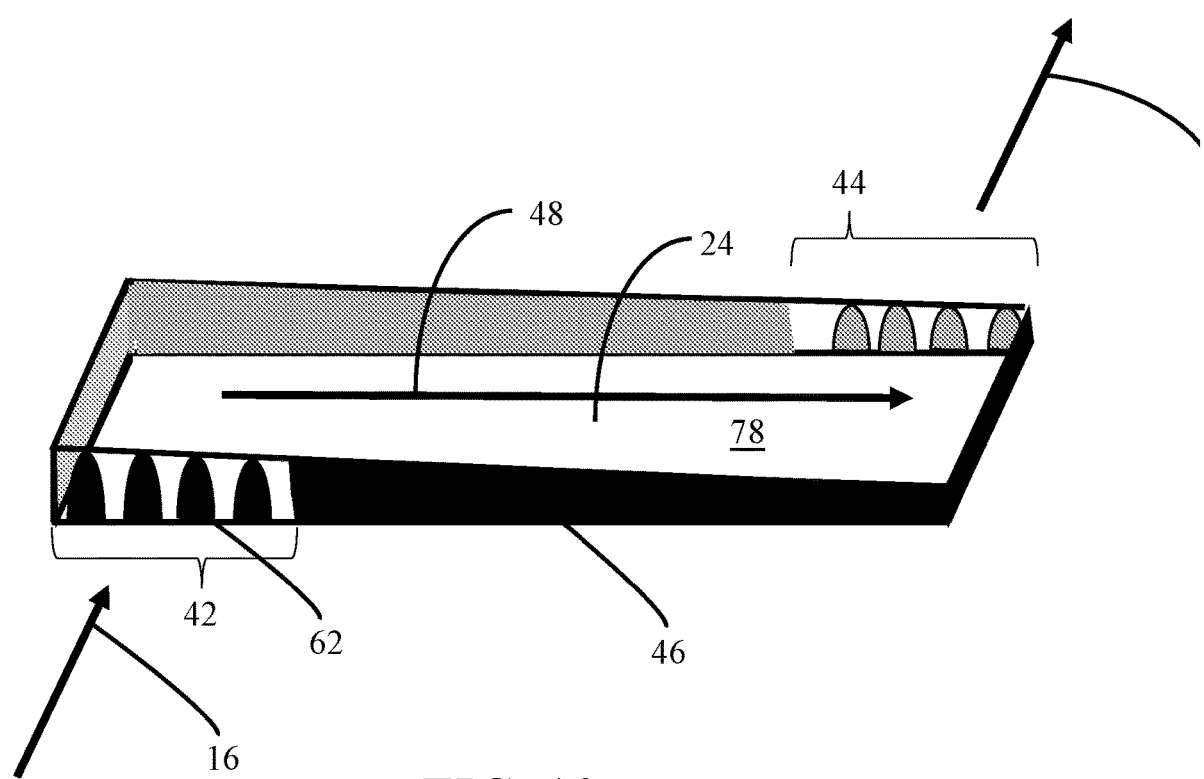
FIG. 10 is an isometric view of a feed space envelope with taller entrance space on one end of the feed space envelope and a thinner exit space on the opposite end of the feed space envelope.

In an example embodiment of the present invention shown in FIG. 10, feed space 78 can comprise variable height feed spacers 62 to facilitate higher volume flow of feed solution 16 at the feed solution entrance point and the lower flow rate of reject solution 18 at the exit point of membrane sheet 78. In this manner feed fluid velocity can be maintained or modified as its volume is reduced by permeation through the membrane and fluid shear and other fluid dynamic characteristics such as turbulent flow can be accommodated as the feed space channel becomes shorter in height. Barrier lines 46 confine the fluid to feed space 78 at all points around the perimeter of feed space 78 except the feed and reject openings.

Figure 11:
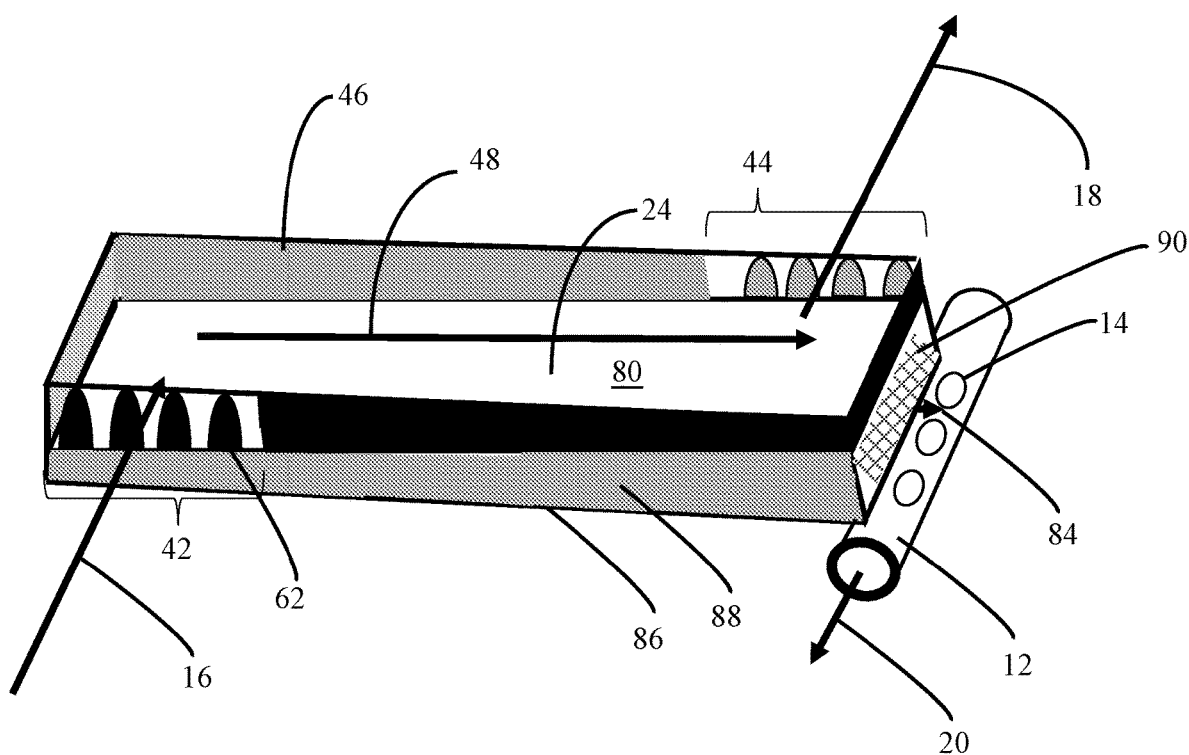
FIG. 11 is an isometric view of a membrane assembly prior to rolling that shows both a variable height feed space envelope and a variable height permeate space with flows in both feed and permeate spaces that are perpendicular to the center tube.

In the configuration of membrane element 80 of the example embodiment shown in FIG. 11, the feed space can comprise variable height feed spacers 62 to facilitate higher volume flow of feed solution 16 at the feed solution entrance opening 42 and the lower flow rate of reject solution 18 at the reject exit opening 44. In this manner fluid shear and other fluid dynamic characteristics such as turbulent flow can be accommodated as feed fluid 48 in the feed space channel becomes smaller in unit volume. Barrier lines 46 confine the fluid to the feed space at all points around the perimeter of the feed space except the feed and reject openings. In corresponding fashion, permeate space 86 can comprise variable height spacers or single or multiple stacked layers of permeate carrier mesh 90. Permeate envelope 86 can be sealed around three sides with an appropriate adhesive 88. Permeate solution 20 is collected from permeate carrier 90 through center tube holes 14 in to center tube 12. As in the normal construction techniques in conventional membrane elements, the center tube is sealed to the membrane leaves with an appropriate adhesive at the time that the membrane leaves are wrapped around the center tube during construction.

Barrier lines 46 can be incorporated into the manufacturing process in a number of ways and can comprise many different materials. For example, if a mesh spacer is used in the feed space, the barrier lines can be applied in the form of a viscous liquid, such as the adhesive used to bond the membrane sheet to the permeate carrier to create the membrane envelope. In such a case the barrier lines can be created by depositing the adhesive directly onto the feed spacer mesh at the outer edges to define the fluid flow path. The adhesive will penetrate the mesh in order to create the barrier lines when the membrane is rolled. The barrier lines can comprise strips of solid material equal in thickness to the feed spacer placed onto or adhered to the membrane envelope surface, with feed spacer mesh trimmed to fit the space between the strips. If printed feed spacer is used, the barrier lines can comprise additional printed features the same height as the feed spacer; viscous adhesive applied on top of printing which fills in gaps between printed features, as in the mesh example; or a separate layer of solid material equal in thickness to the feed spacer placed onto or adhered to the membrane envelope surface, with printed feed spacer features filling the enclosed area. Other materials compatible with the separated fluid and membrane sheet can be used in place of the above-mentioned adhesives including, but not limited to, thermoplastics, reactive polymers, waxes, or resins. Solid materials can comprise the aforementioned materials or other materials that are compatible with the separated fluid even if not compatible with direct deposition to the membrane sheet, including, but not limited to high-temperature thermoplastics, metals, or ceramics, which are pre-formed, cast, or cut to the proper dimensions and placed onto or adhered to the surface of the membrane envelope prior to rolling of the element.

The present invention has been described in connection with various example embodiments. It will be understood that the above descriptions are merely illustrative of the applications of the principles of the present invention, the scope of which is to be determined by the claims viewed in light of the specification. Other variants and modifications of the invention will be apparent to those skilled in the art.

What is claimed is:

1. A spiral wound element, comprising a collection tube and one or more permeable membrane sheets each having an active surface and a permeate surface, mounted together such that active surfaces face active surfaces and are separated from each other by a feed spacing system providing a feed space, and such that permeate surfaces face permeate surfaces and are separated from each other by a permeate spacer system providing a permeate space, with each sheet having a proximal end proximal the collection tube and a distal end distal from the collection tube, and having first and second edges extending from the proximal to the distal end, where the feed spacing system is configured to prevent fluid flow from the feed space at the distal end, and to prevent fluid flow from the feed space along the edges except through one or more openings along the first edge, the second edge, or both, which openings represent less than the entire length of the corresponding edge;

wherein the feed spacing system comprises:
  (a) a distal end barrier sealingly engaging the active surfaces of two membrane sheets along the distal ends thereof;
  (b) a proximal end barrier sealingly engaging the active surfaces of the two membrane sheets along the proximal ends thereof;
  (c) a first edge barrier sealingly engaging the active surfaces of the two membrane sheets along the first edges thereof and extending from the proximal ends to the distal ends except for a feed flow opening spaced apart from the proximal ends spaced apart from the distal ends; and
  (d) a second edge barrier sealingly engaging the active surfaces of the two membrane sheets along the second edges thereof and extending from the proximal ends to the distal ends except for a second feed flow opening near the proximal ends and a third feed flow opening near the distal ends.

2. A spiral wound element, comprising a collection tube and one or more permeable membrane sheets each having an active surface and a permeate surface, mounted together such that active surfaces face active surfaces and are separated from each other by a feed spacing system providing a feed space, and such that permeate surfaces face permeate surfaces and are separated from each other by a permeate spacer system providing a permeate space, with each sheet having a proximal end proximal the collection tube and a distal end distal from the collection tube, and having first and second edges extending from the proximal to the distal end, where the feed spacing system is configured to prevent fluid flow from the feed space at the distal end, and to prevent fluid flow from the feed space along the edges except through one or more openings along the first edge, the second edge, or both, which openings represent less than the entire length of the corresponding edge; wherein the feed spacing system comprises:
  (a) a distal end barrier sealingly engaging the active surfaces of two membrane sheets along the distal ends thereof;
  (b) a proximal end barrier sealingly engaging the active surfaces of the two membrane sheets along the proximal ends thereof;
  (c) a first edge barrier sealingly engaging the active surfaces of the two membrane sheets along the first edges thereof, wherein the first edge barrier extends from the proximal ends of the sheets to the distal ends of the sheets except for a first feed flow opening near the proximal ends; and
  (d) a second edge barrier sealingly engaging the active surfaces of the two membrane sheets along the second edges thereof, wherein the second edge barrier extends from the proximal ends of the sheets to the distal ends of the sheets except for a second feed flow opening near the distal ends;
  wherein the feed space separates the two sheets by a first distance near the distal and proximal ends and by second distance apart from the distal and proximal ends, wherein the first distance is greater than the second distance.

3. The spiral wound element of claim 2, wherein the feed spacing system separates the two sheets by a distance that smoothly tapers from the first distance to the second distance along the length of the sheets.

4. The spiral wound element of claim 2, wherein the permeate spacer system separates the two sheets by a third distance near the distal ends and by a fourth distance near the proximal ends, wherein the difference between the fourth and third distances corresponds to the distance between the first and second distances.

5. A system for treating water, comprising one or more spiral wound elements as in claim 1.

6. A method for treating water, comprising providing a system as in claim 5, supplying feed fluid to the system, and accepting treated water from the permeate space of the system.

7. A spiral wound element as in claim 1, wherein the permeate space system, the feed spacing system, or both, comprise one or more mesh spacers.

8. A spiral wound element as in claim 1, wherein the permeate space system, the feed spacing system, or both, comprise a material printed, embossed, or deposited on one or more surfaces of the membrane sheets.

9. A system for treating water, comprising one or more spiral wound elements as in claim 2.

10. A method for treating water, comprising providing a system as in claim 9, supplying feed fluid to the system, and accepting treated water from the permeate space of the system.

11. A spiral wound element as in claim 2, wherein the permeate space system, the feed spacing system, or both, comprise one or more mesh spacers.

12. A spiral wound element as in claim 2, wherein the permeate space system, the feed spacing system, or both, comprise a material printed, embossed, or deposited on one or more surfaces of the membrane sheets.

* * * * *